US012742558B2

(12) United States Patent
Nakamura

(10) Patent No.: US 12,742,558 B2
(45) Date of Patent: Sep. 22, 2026

(54) WORK SPACE FORMING EQUIPMENT, WORK METHOD, AND MANAGEMENT SPACE FACILITY

(71) Applicant: JGC JAPAN CORPORATION, Kanagawa (JP)

(72) Inventor: Kentaro Nakamura, Kanagawa (JP)

(73) Assignee: JGC JAPAN CORPORATION, Kanagawa (JP)

( * ) Notice: Subject to any disclaimer, the term of this patent is extended or adjusted under 35 U.S.C. 154(b) by 0 days.

(21) Appl. No.: 19/105,333

(22) PCT Filed: Dec. 6, 2023

(86) PCT No.: PCT/JP2023/043615
§ 371 (c)(1),
(2) Date: Feb. 20, 2025

(87) PCT Pub. No.: WO2024/157617
PCT Pub. Date: Aug. 2, 2024

(65) Prior Publication Data

US 2026/0110448 A1 Apr. 23, 2026

(30) Foreign Application Priority Data

Jan. 24, 2023 (JP) ................................ 2023-008518

(51) Int. Cl.
*F24F 3/167* (2021.01)
*E04B 1/343* (2006.01)
(Continued)

(52) U.S. Cl.
CPC ............. *F24F 3/167* (2021.01); *E04B 1/343* (2013.01); *F24F 11/0001* (2013.01); *G05D 3/12* (2013.01);
(Continued)

(58) Field of Classification Search
CPC ...................................................... F24F 3/167
See application file for complete search history.

(56) References Cited

U.S. PATENT DOCUMENTS 5,143,287 A * 9/1992 Jardinier .............. F24F 11/0001 251/30.05
2001/0027658 A1* 10/2001 Ota ....................... F04B 49/065 62/228.3
(Continued)

FOREIGN PATENT DOCUMENTS

JP H0622838 3/1994
JP H0956757 3/1997
(Continued)

OTHER PUBLICATIONS

"International Search Report (Form PCT/ISA/210) of PCT/JP2023/043615", mailed on Feb. 27, 2024, with English translation thereof, pp. 1-4.
(Continued)

*Primary Examiner* — Nathan L Laughlin
(74) *Attorney, Agent, or Firm* — JCIPRNET

(57) ABSTRACT

Work space equipment 3 includes a movable wall 33 capable of entering a clean space 20 and exiting from the clean space 20, and a definition sheet 34 that stretches along with the entry of the movable wall 33 into the clean space 20 and shrinks along with the exit of the movable wall 33 from the clean space 20 while maintaining a state where a work space 30 is separated from the clean space 20. The work space equipment 3 switches between a storage form T1 in which the movable wall 33 exists from the clean space 20 to define a work space 30A and an expansion form T2 in which the movable wall 33 enters the clean space 20 to define a work space 30B wider than the work space 30A.

20 Claims, 11 Drawing Sheets

(51) Int. Cl.
*F24F 11/00* (2018.01)
*G05D 3/12* (2006.01)
*F24F 110/40* (2018.01)

(52) U.S. Cl.
CPC ... *F24F 2011/0004* (2013.01); *F24F 2110/40* (2018.01)

(56) References Cited

U.S. PATENT DOCUMENTS

2006/0272579 A1* 12/2006 Nakao ...................... G21K 5/10 118/723 EB
2014/0059945 A1* 3/2014 Gardner ............... H05K 7/1497 52/64
2014/0163326 A1 6/2014 Forsell
2017/0333907 A1* 11/2017 Berberich ............... F24F 3/163
2024/0151028 A1* 5/2024 Wang ...................... E04B 2/827

FOREIGN PATENT DOCUMENTS

JP H1174128 3/1999
JP 2009052785 3/2009
JP 2013135036 7/2013

OTHER PUBLICATIONS

"Search Report of Europe Counterpart Application", issued on Jun. 12, 2026, p. 1-p. 9.

* cited by examiner (a)

(b)

WORK SPACE FORMING EQUIPMENT, WORK METHOD, AND MANAGEMENT SPACE FACILITY

CROSS-REFERENCE TO RELATED APPLICATION

This application is a 371 of international application of PCT application serial no. PCT/JP2023/043615, filed on Dec. 6, 2023, which claims the priority benefit of Japan application no. 2023-008518, filed on Jan. 24, 2023. The entirety of each of the above-mentioned patent applications is hereby incorporated by reference herein and made a part of this specification.

TECHNICAL FIELD

The present invention relates to work space forming equipment, a work method, and a management space facility.

BACKGROUND ART

A management space where an internal pressure is managed is used in various applications. For example, a clean room can be a management space managed such that the internal pressure is constantly higher than an atmospheric pressure. A coating booth can be the management space managed such that the internal pressure is constantly lower than the atmospheric pressure.

CITATION LIST

Patent Literature

Patent Literature 1: JP H09-56757 A

SUMMARY OF INVENTION

Technical Problem

For example, in a case where some operation is performed on a device installed in a clean room, a worker enters the clean room. When the worker enters the clean room, various preparations for maintaining a degree of cleanliness of the clean room are required. For example, the worker needs to take an air shower after wearing a dustproof clothing. Patent Literature 1 discloses a technology that saves such labor of entry. Patent Literature 1 discloses an access wall capable of examining a patient in a sterile room without entering the sterile room.

An operation of the clean room requires various pieces of ancillary equipment for operating the clean room in addition to equipment related to the clean room itself. Thus, it takes time and effort to prepare for entering the room, and corresponding cost is generated in preparation and operation of the ancillary equipment.

Accordingly, in this field, a technology that can easily access a work target disposed in a management space has been desired.

Solution to Problem

One embodiment of the present invention is [1] "work space forming equipment that forms a work space for performing a work related to a work target disposed in a management space where an internal pressure is managed, the equipment including a movable wall in which a work site facing the work target is provided, the movable wall being capable of entering the management space and exiting from the management space, and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface that defines the management space, in which switching is performed between a first form in which the movable wall exits from the management space to define a first work space, and a second form in which the movable wall enters the management space to define a second work space wider than the first work space.".

The work space forming equipment forms the work space separated from the management space. This work space is formed by the movable wall and the definition sheet. As a result, the movable wall including the work site can be brought close to the work target while maintaining a state where the work space is separated from the management space. Accordingly, the work target disposed in the management space can be accessed from the work space separated from the management space without entering the management space.

One embodiment of the present invention is [2] "the work space forming equipment according to the above [1], further including a movable floor movable on a management space floor surface that defines the management space along with the movement of the movable wall and having an entry surface facing the work space.". This configuration also allows easy access the work target disposed in the management space.

One embodiment of the present invention is [3] "the work space forming equipment according to the above [2], further including a fixed floor provided in the work space, in which the movable floor and the movable wall enter the management space from a distal end portion of the fixed floor.". This configuration also allows easy access the work target disposed in the management space.

One embodiment of the present invention is [4] "the work space forming equipment according to any one of the above [1] to [3], in which the definition sheet has a definition sheet outer surface exposed to the management space and a definition sheet inner surface exposed to the work space, and has a wave shape in which crest portions and valley portions are alternately formed, in the definition sheet, a distance between the crest portion and the valley portion in the first form is a first distance, and a distance between the crest portion and the valley portion in the second form is a second distance, and the second distance is smaller than the first distance.". According to this configuration, the ceiling and the side wall that can follow the movement of the movable wall can be formed.

One embodiment of the present invention is [5] "the work space forming equipment according to any one of the above [1] to [4], in which a globe that protrudes from a movable wall outer surface of the movable wall facing the management space to the management space and is capable of being brought into contact with the work target while maintaining a state where the work space is separated from the management space is provided in the work site.". According to this configuration, the worker can manually perform the work on the work target.

One embodiment of the present invention is [6] "the work space forming equipment according to any one of the above

[1] to [5], further including a first control unit that outputs a start control command for starting the movement of the movable wall, and a second control unit that outputs a pressure control command for controlling the internal pressure of the management space, in which the first control unit outputs an advance notice command for giving an advance notice of outputting the start control command to the second control unit before the start control command is output, and the second control unit changes a content of the pressure control command in accordance with the advance notice command.". According to this configuration, the internal pressure of the management space can be maintained at a predetermined value.

One embodiment of the present invention is [7] "the work space forming equipment according to any one of the above [1] to [5], further including a first control unit that outputs a start control command for starting the movement of the movable wall, and a second control unit that outputs a pressure control command for controlling the internal pressure of the management space, in which the second control unit acquires information indicating the internal pressure of the management space, and outputs a request command for giving a request about stop of the movement of the movable wall or restart of the movement of the movable wall to the first control unit in accordance with the information indicating the internal pressure of the management space.". This configuration also allows the internal pressure of the management space to be maintained at a predetermined value.

Another embodiment of the present invention is [8] "a work method for performing a work related to a work target disposed in a management space where an internal pressure is managed, the method including a step of expanding the work space by operating work space forming equipment that is provided in management space forming equipment that forms the management space and forms a work space for performing the work related to the work target, and a step of performing a predetermined work on the work target through a work site in the expanded work space, in which the work space forming equipment includes a movable wall in which the work site facing the work target is provided, the movable wall being capable of entering the management space and exiting from the management space, and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface defining the management space, and in the step of expanding the work space, the work space is expanded by switching from a first form in which the movable wall exits from the management space to define a first work space to a second form in which the movable wall enters the management space to define a second work space wider than the first work space.".

According to this work method, the work space can be brought close to the work target by the step of expanding the work space. Further, the worker can perform a predetermined work on the work target from the work space. Accordingly, according to this work method, the worker can easily access the work target disposed in the management space.

Still another embodiment of the present invention is [9] "a management space facility including management space forming equipment in which an internal pressure is managed, the management space forming equipment forming a management space for accommodating a work target, and work space forming equipment that performs a work related to the work target from a work space separated from the management space, in which the work space forming equipment includes a movable wall in which a work site facing the work target is provided, the movable wall being capable of entering the management space and exiting from the management space, and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface that defines the management space, and switches between a first form in which the movable wall exits from the management space to define a first work space and a second form in which the movable wall enters the management space to define a second work space wider than the first work space.".

The management space facility includes the above-described work space forming equipment. Accordingly, similarly to the work space forming equipment, the work target disposed in the management space can be accessed from the work space separated from the management space.

Advantageous Effects of Invention

According to the present invention, the work space forming equipment, the work method, and the management space facility that can easily access the work target disposed in the management space are provided.

Figure 5:
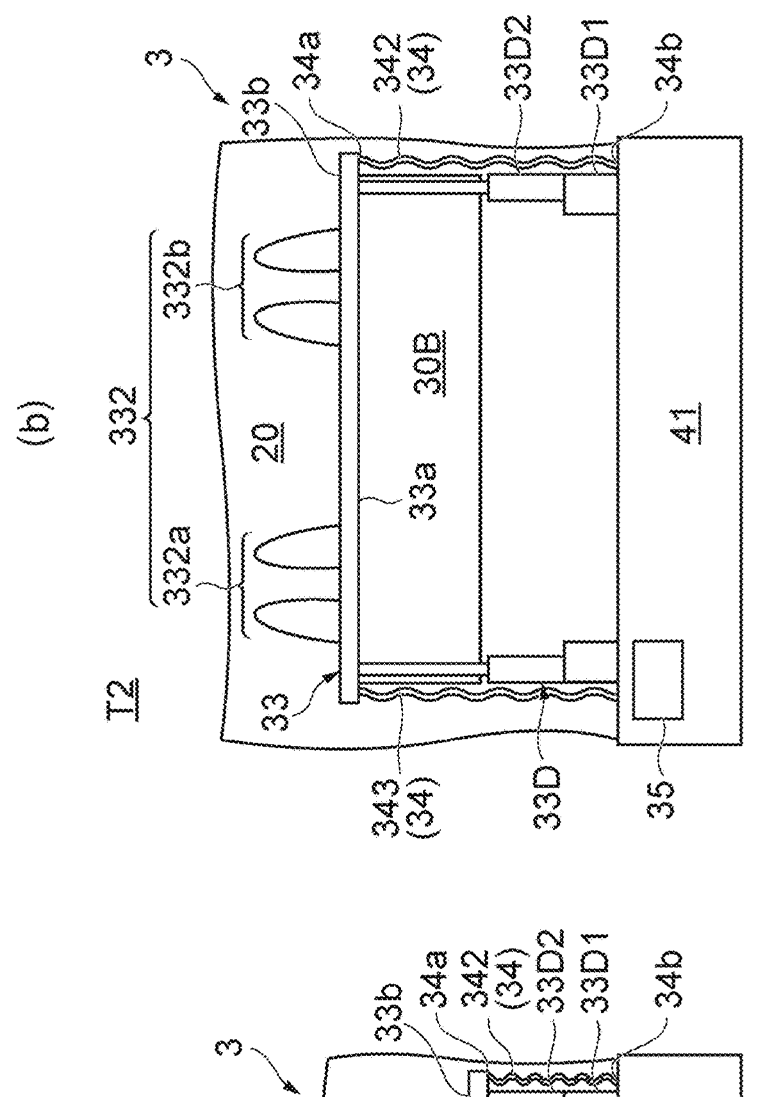
Figure 5:
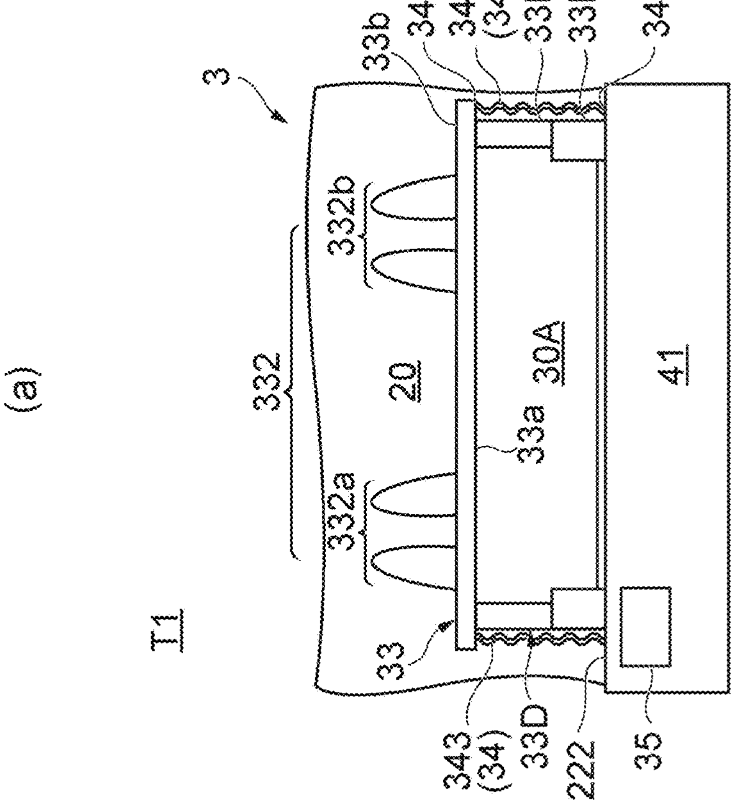

(a) of FIG. 5 is a plan view illustrating a storage form of work space equipment. (b) of FIG. 5 is a plan view illustrating an expansion form of the work space equipment.

Figure 6:
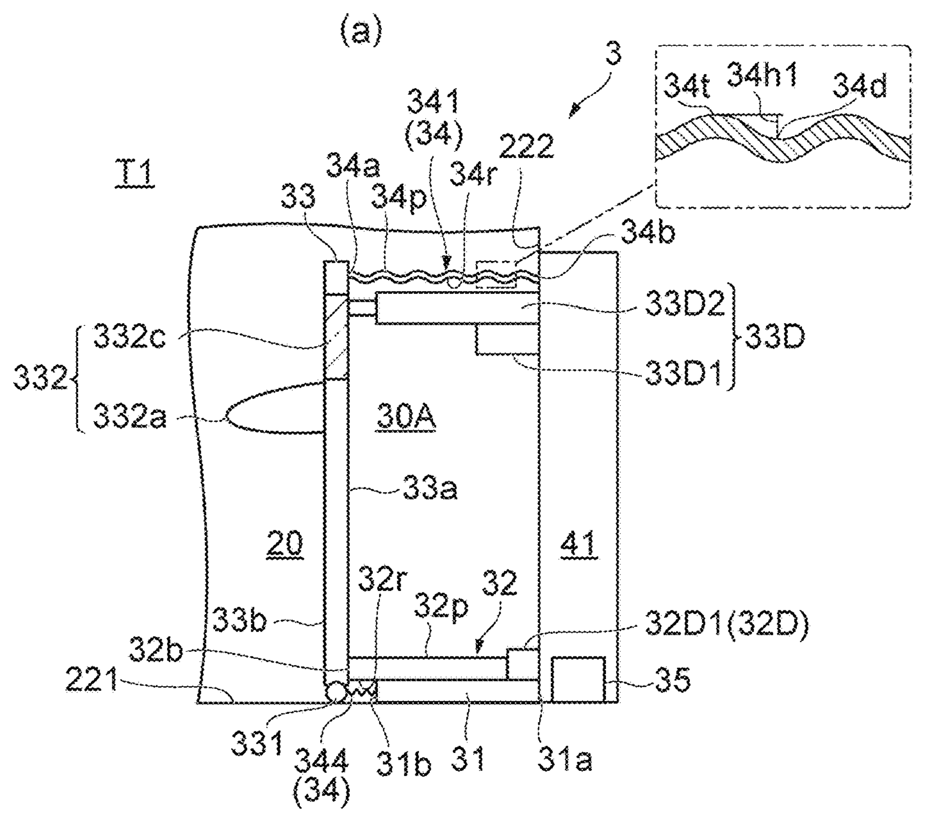
Figure 6:
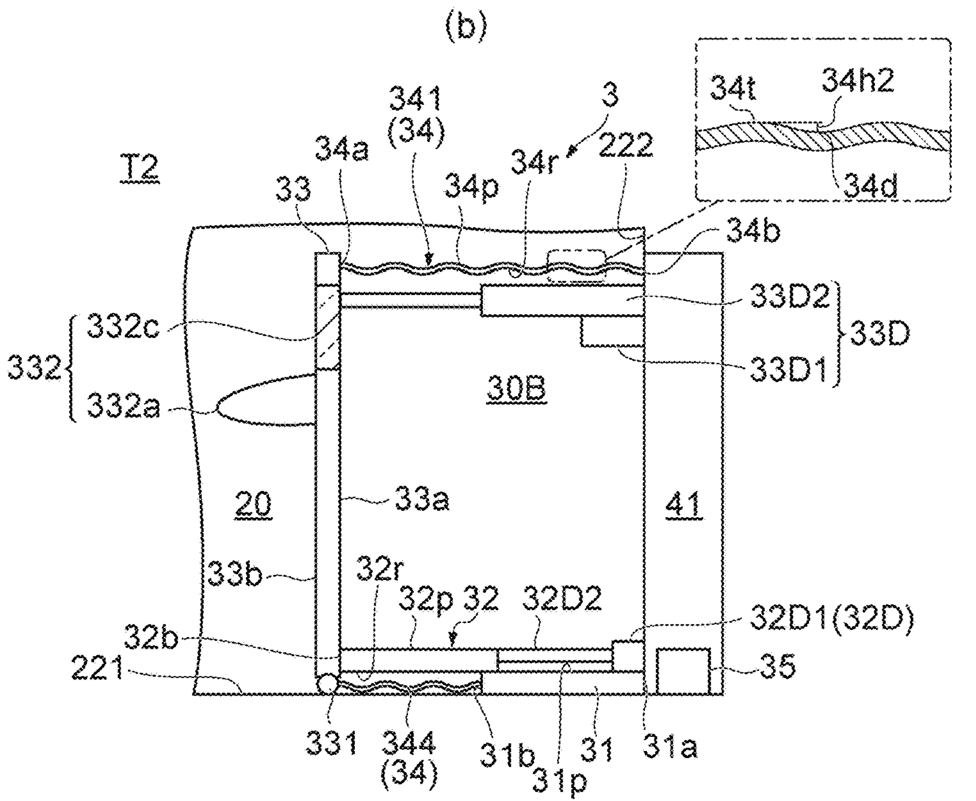
Figure 7:
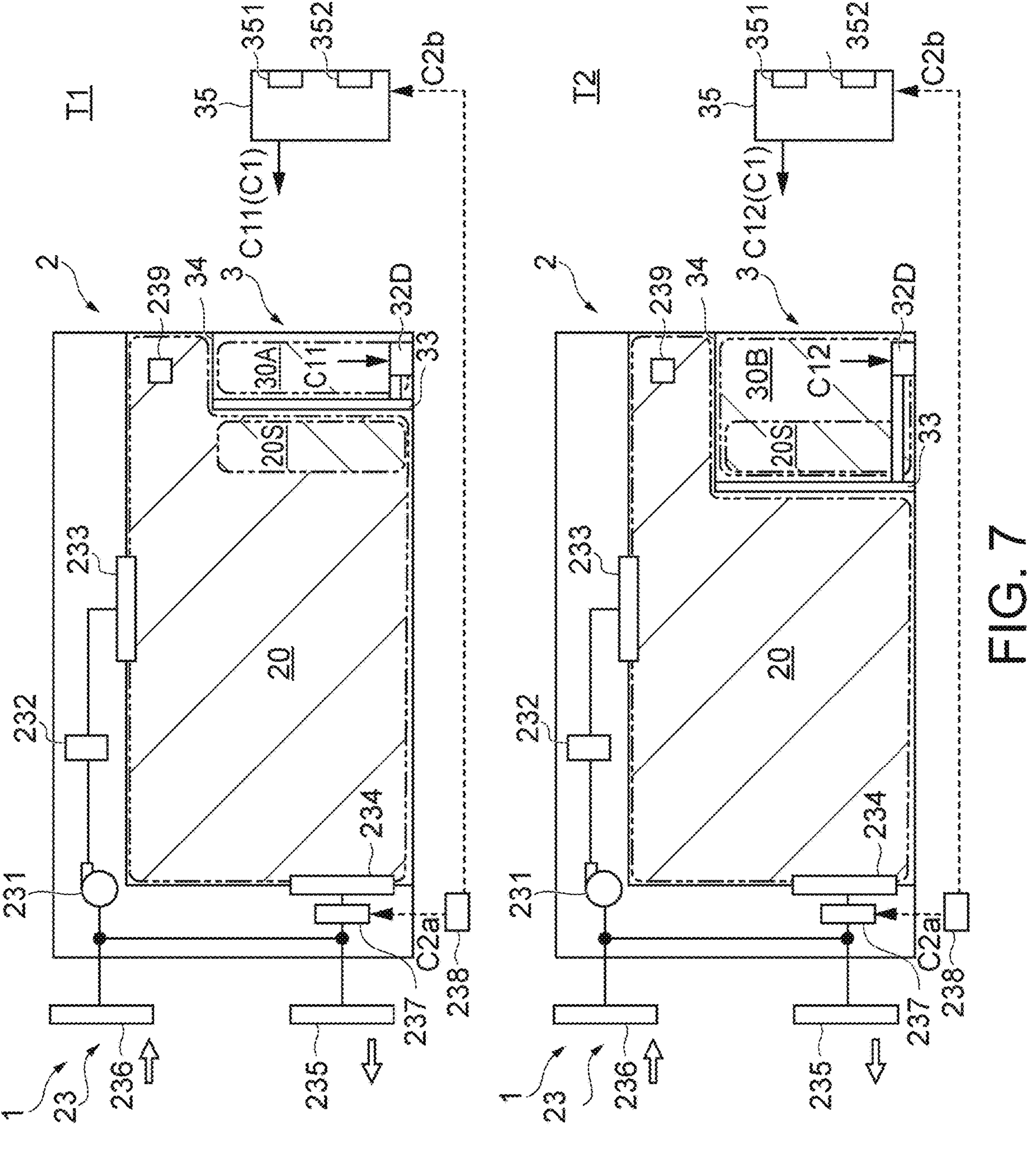

(a) of FIG. 6 is a side view illustrating a storage form of the work space equipment. (b) of FIG. 6 is a side view illustrating an expansion form of the work space (a) of FIG. 7 is a side view visualizing a clean space and a work space in the storage form. (b) of FIG. 7 is a side view visualizing the clean space and the work space in the expansion form.

Figure 8:
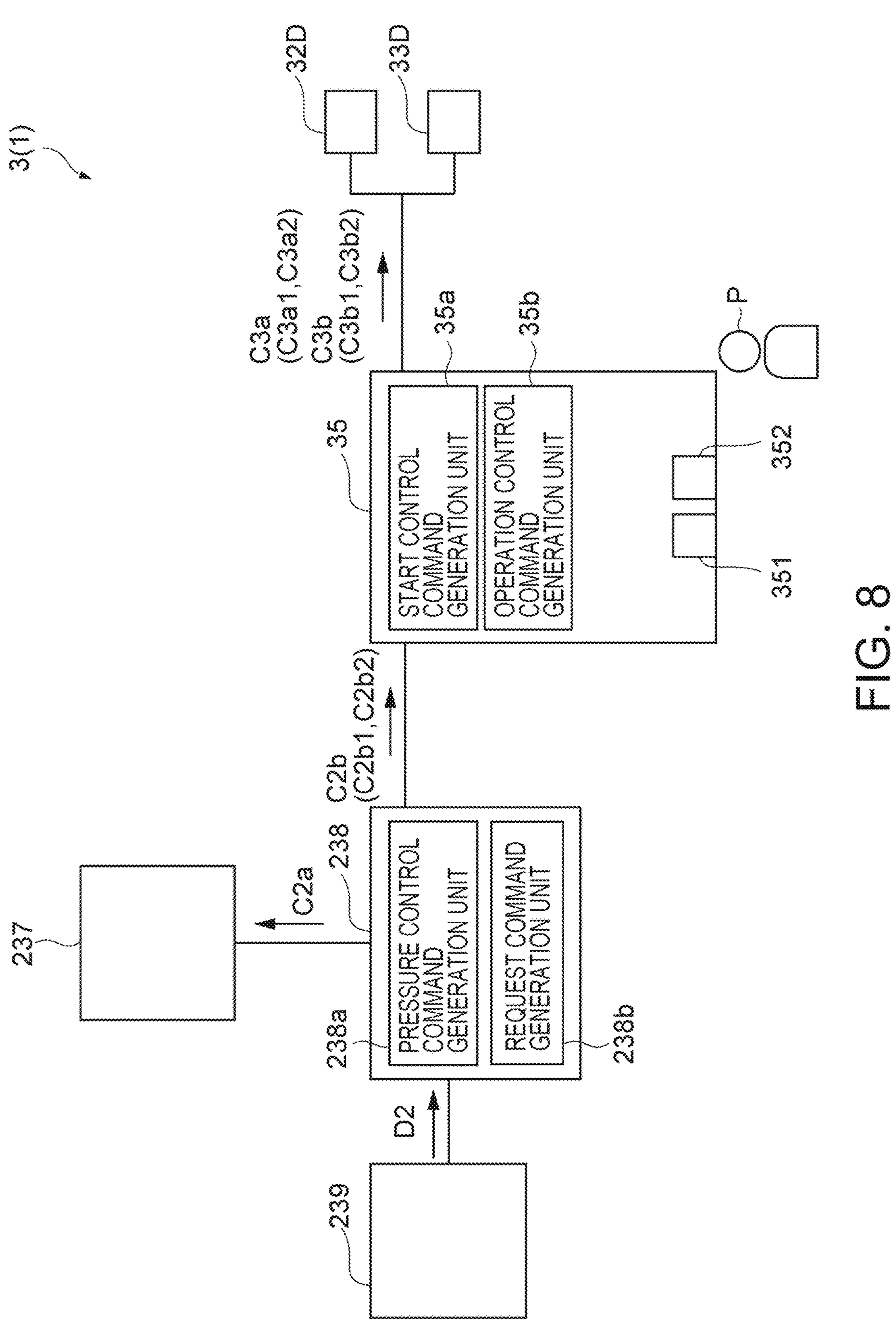

FIG. 8 is a block diagram for explaining an air conditioning controller and a work space controller of an embodiment.

Figure 9:
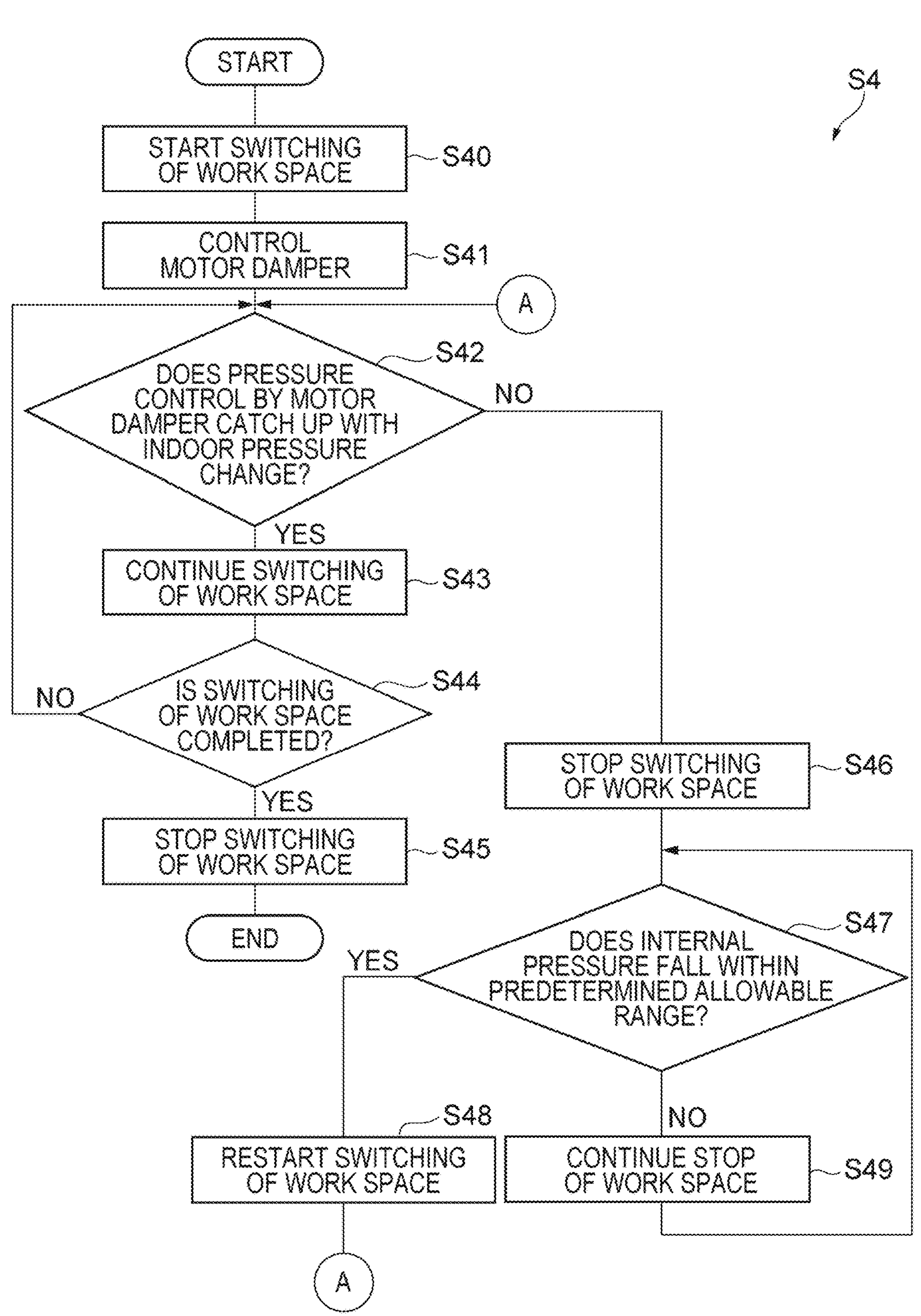

FIG. 9 is a flowchart for explaining switching operations by the air conditioning controller and the work space controller.

Figure 10:
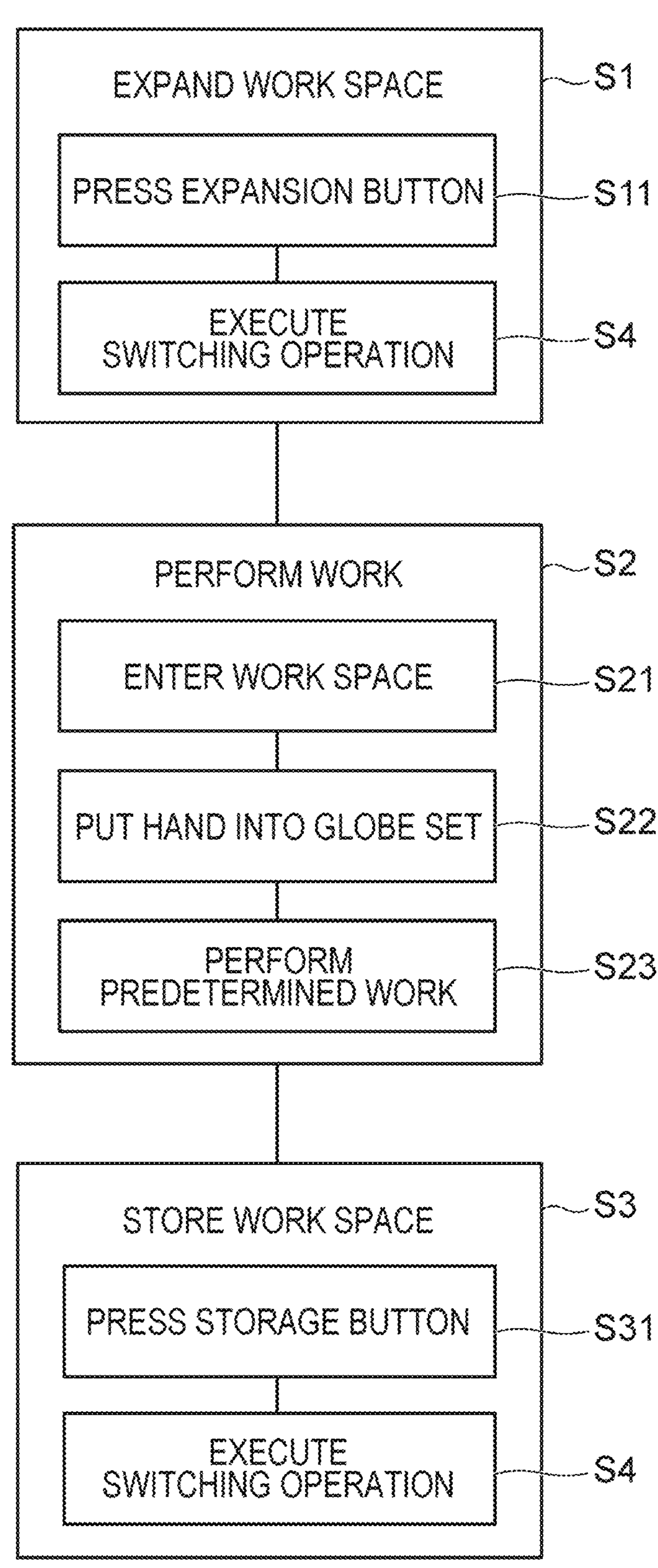

FIG. 10 is a flowchart illustrating main steps of a work method.

Figure 11:
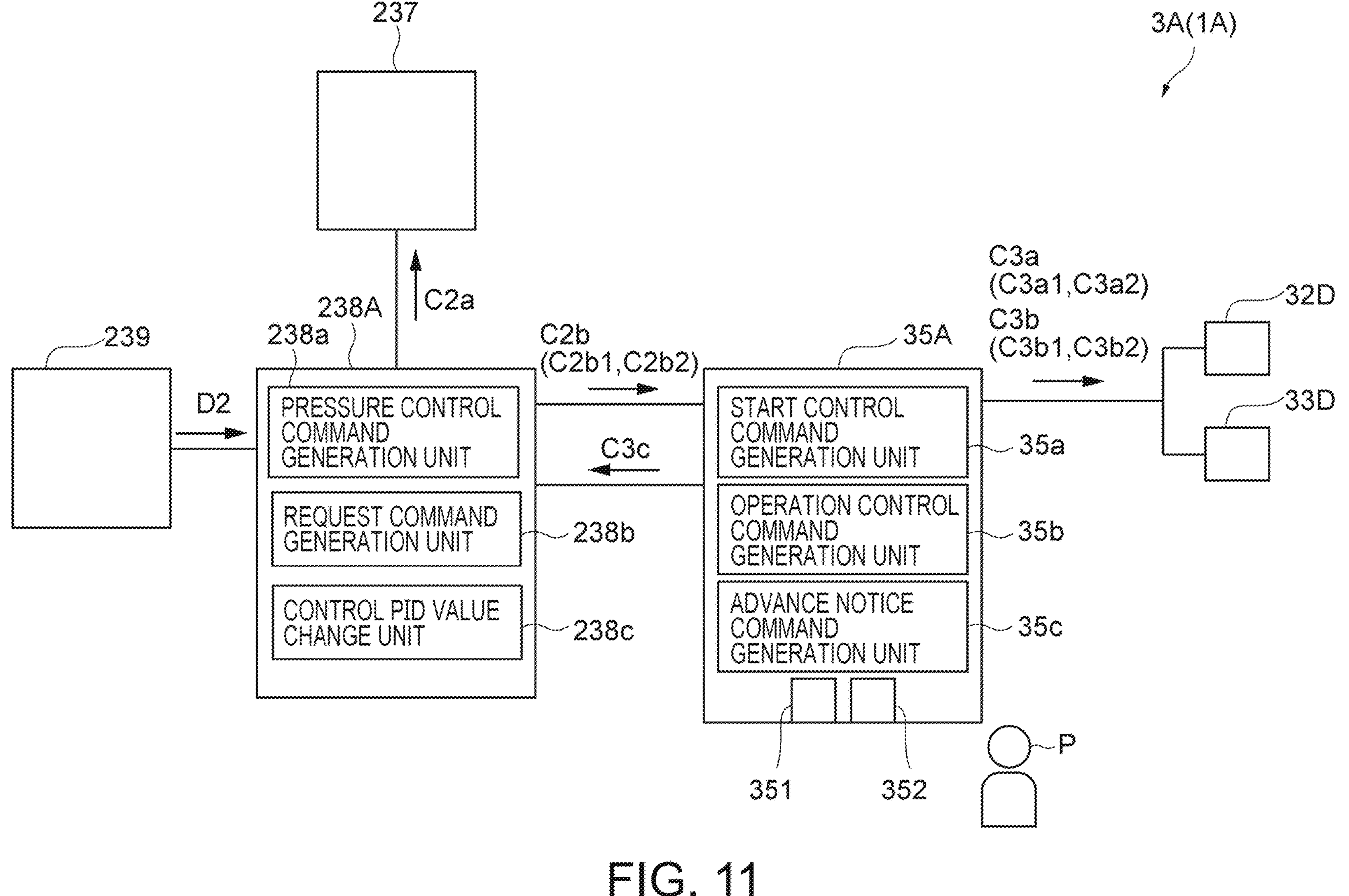

FIG. 11 is a block diagram for explaining an air conditioning controller and a work space controller according to a modification.

DESCRIPTION OF EMBODIMENTS

Hereinafter, embodiments of the present invention will be described in detail with reference to the accompanying drawings. In the description of the drawings, the same elements are denoted by the same reference signs, and redundant description will be omitted.

Clean Room Equipment

Figure 1:
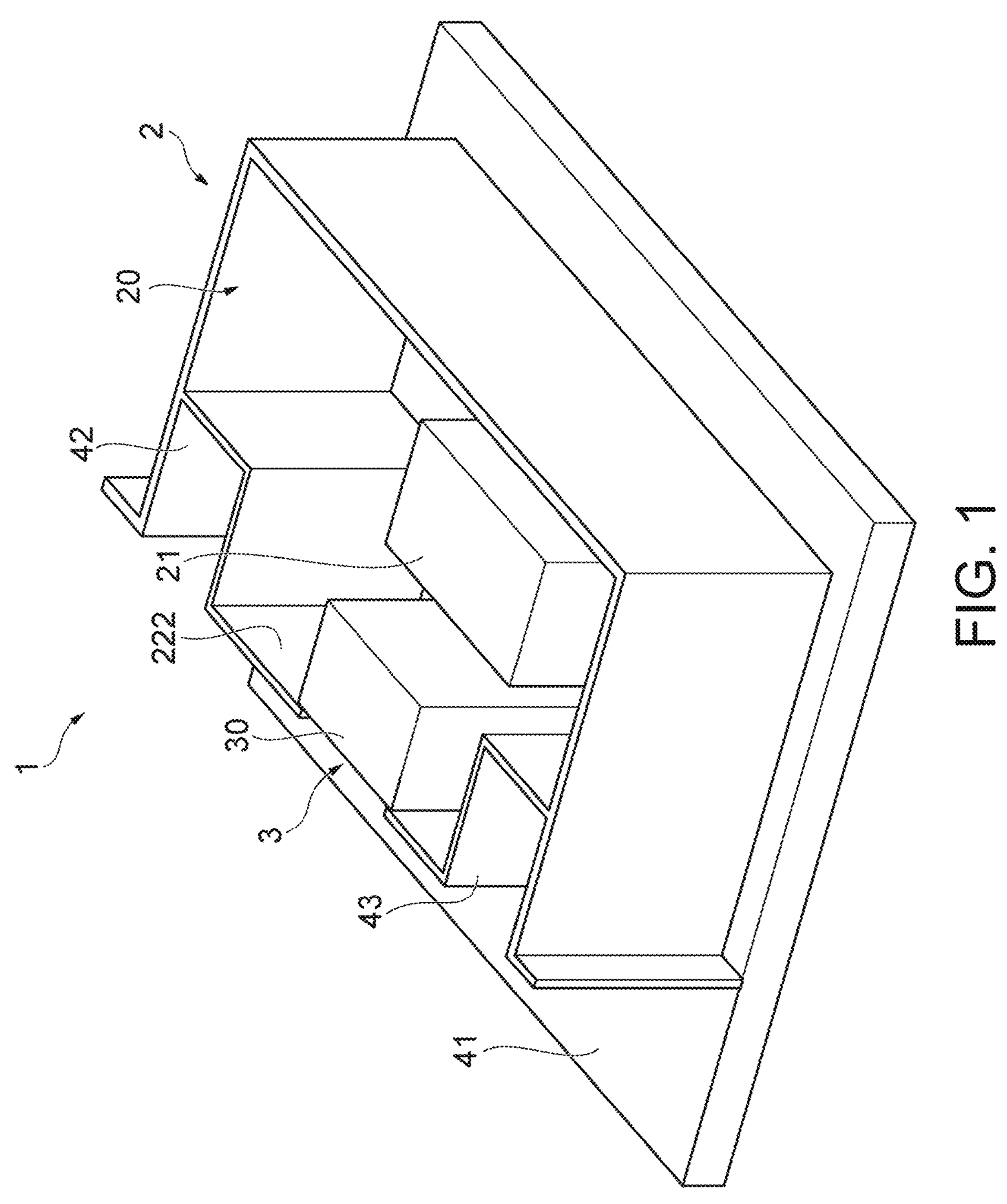
FIG. 1 is a schematic perspective view of a clean room facility.

A clean room facility 1 (management space facility) illustrated in FIG. 1 includes clean room equipment 2 (management space forming equipment) and work space equipment 3 (work space forming equipment). The clean room equipment 2 forms a clean space 20 (management space). The work space equipment 3 (work space) forms a work space 30. According to the clean room facility 1, a worker can operate a liquid formulation filling module 21 installed in the clean space 20 from the work space 30 without entering the clean space 20.

The management space may be defined as a space maintained in a state different from a state of a surrounding environment. An example of the management space is the clean space 20. The clean space 20 is managed such that a degree of cleanliness of an indoor air has a predetermined value. The clean space 20 is managed such that an indoor pressure is higher than an outdoor pressure in order to maintain the degree of cleanliness. The clean space 20 is managed so as to have a positive pressure.

Figure 2:
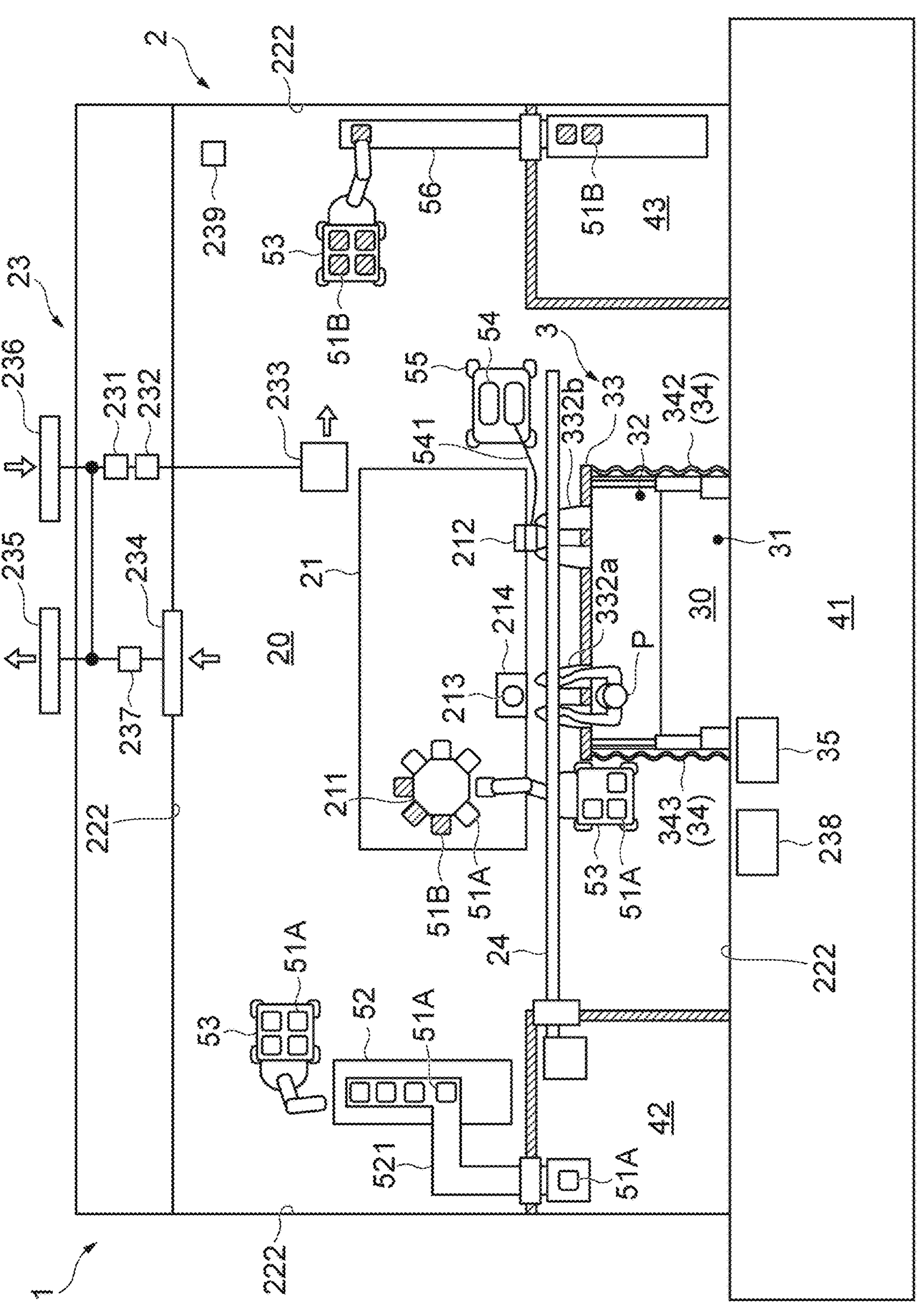
FIG. 2 is a plan view illustrating a usage example of clean room equipment illustrated in FIG. 1.
Figure 3:
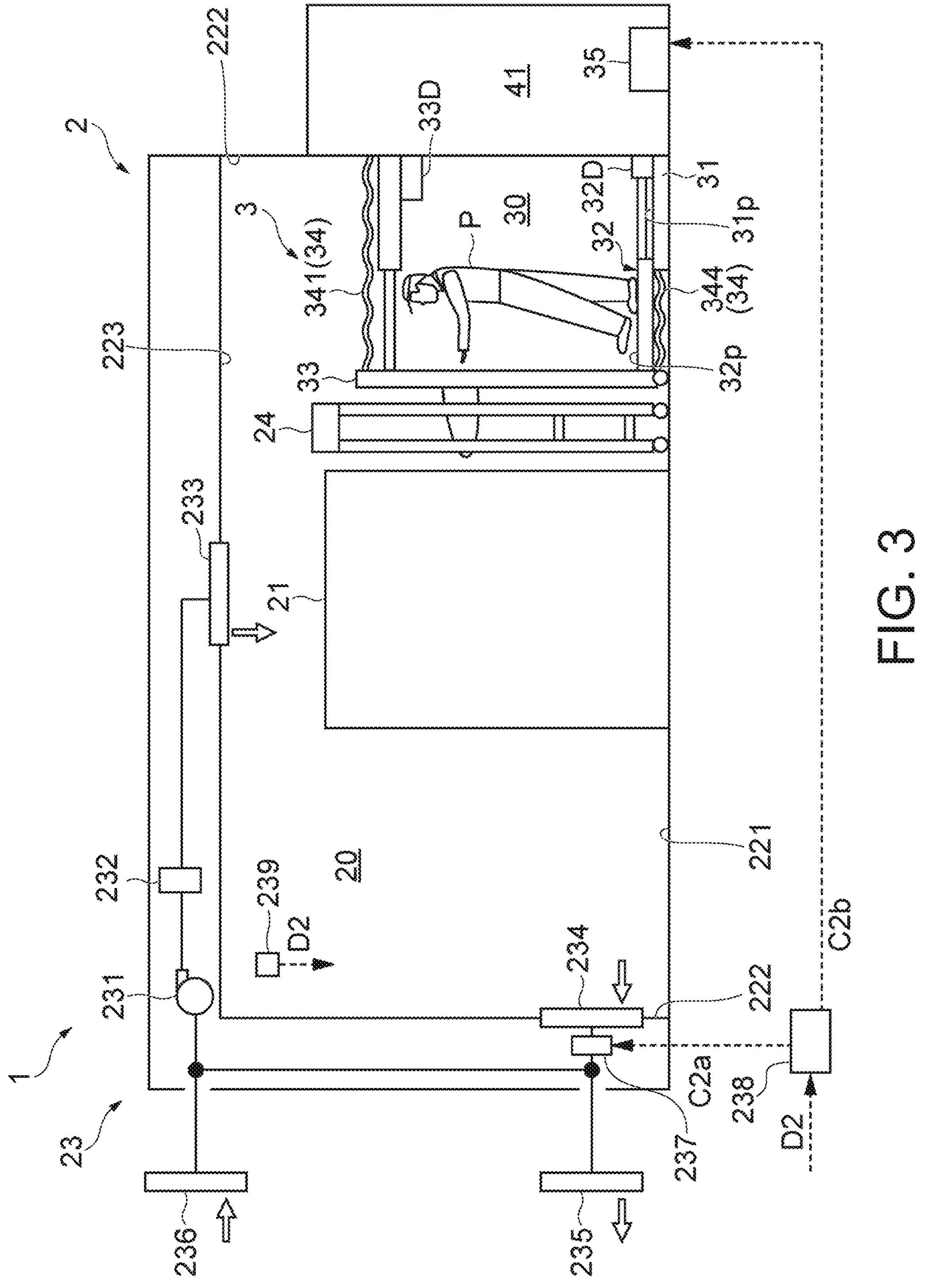
FIG. 3 is a side view illustrating the usage example of the clean room equipment illustrated in FIG. 1.

FIGS. 2 and 3 are examples of a layout in a case where chemicals are produced by using the clean space 20 illustrated in FIG. 1. The clean room equipment 2 has a clean room floor surface 221 (management space floor surface), a clean room wall surface 222 (management space wall surface), and a clean room ceiling surface 223. The clean room floor surface 221, the clean room wall surface 222, and the clean room ceiling surface 223 define the clean space 20.

The clean room equipment 2 has an air conditioning module 23 for maintaining the degree of cleanliness of the clean space 20 at a predetermined value. The air conditioning module 23 includes a fan 231, a filter 232, an air supply port 233, an air intake port 234, an outside air discharge port 235, an outside air intake port 236, a motor damper 237, and an air conditioning controller 238 (second control unit).

The fan 231 sends air to the filter 232. The filter 232 purifies the received air. The purified air is sent from the air supply port 233 to the clean space 20. The air in the clean space 20 is taken in from the air intake port 234. The air taken in from the air intake port 234 is again sent to the fan 231 via the motor damper 237. The outside air discharge port 235 and the outside air intake port 236 are connected to a duct connecting the motor damper 237 to the fan 231.

The air taken in from the outside air intake port 236 is sent to the fan 231 together with the air taken in from the air intake port 234. When the amount of air sent from the air supply port 233 into the clean space 20 is equal to the amount of air taken in from the air intake port 234, a state of the positive pressure of the clean space 20 is maintained. On the other hand, an internal pressure of the clean space 20 may become higher than a predetermined pressure for some reason. For example, when the amount of air sent from the air supply port 233 to the clean space 20 is larger than the amount of air taken in from the air intake port 234, the internal pressure of the clean space 20 increases. In this case, in order to lower the increased internal pressure to the predetermined value, the air conditioning controller 238 gives a pressure control command C2$a$ for increasing an opening degree of the motor damper 237 to the motor damper 237. As a result, a part of the air is discharged from the outside air discharge port 235. That is, the motor damper 237 has a function of adjusting the internal pressure of the clean space 20. An operation of the air conditioning controller 238 will be described in detail later.

The work space equipment 3 forms the work space 30. The work space 30 is a space for accessing a work target installed in the clean space 20. The work space 30 is separated from the clean space 20. That is, a state of the work space 30 is different from a state of the clean space 20. For example, the state of the work space 30 may be at the same pressure as the surrounding environment. The state of the work space 30 may be the same degree of cleanliness as the surrounding environment. In other words, the pressure of the work space 30 is lower than the pressure of the clean space 20. The degree of cleanliness of the work space 30 is lower than the degree of cleanliness of the clean space 20.

The work space 30 in such an environment need not be isolated from the surrounding environment. For example, the work space 30 is connected to a corridor 41. A simple partition or door may be provided between the corridor 41 and the work space 30. However, there is no strict partition between the corridor 41 and the work space 30 so as to set the state of the surrounding environment to be different from the state of the work space 30. Accordingly, the worker does not need any preparation when the worker enters the work space 30 from the corridor 41.

The liquid formulation filling module 21 (work target) is installed in the clean space 20. The liquid formulation filling module 21 fills an empty filling container 51A with a chemical solution. Hereinafter, a work performed in the clean space 20 will be specifically described.

First, the empty filling container 51A is carried into the clean space 20 from a loading chamber 42. The carried in empty filling container 51A is conveyed to a predetermined standby position by container conveyance equipment 52 having a conveyor 521. The conveyed empty filling container 51A is set in a magazine 211 of the liquid formulation filling module 21 by a container conveyance robot 53. The liquid formulation filling module 21 takes out the empty filling container 51A from the magazine 211. The liquid formulation filling module 21 fills the empty filling container 51A with the chemical solution. The chemical solution fills in a chemical solution bag 54. The chemical solution bag 54 is connected to the liquid formulation filling module 21 via a tube 541. The chemical solution bag 54 is conveyed to a predetermined position by a chemical solution bag conveyance robot 55. The liquid formulation filling module 21 closes a filling container 51B filled with the chemical solution, and then sets the filling container 51B in the magazine 211 again. The filling container 51B filled with the chemical solution is conveyed to container unloading equipment 56 by the container conveyance robot 53. The container unloading equipment 56 conveys the filling container 51B filled with the chemical solution from the clean space 20 to an unloading chamber 43.

The series of works described above is automatically executed by various kinds of equipment and devices. That is, an operation by a worker P is not required. On the other hand, in addition to the series of works described above, an additional work also occurs. This additional work may require a manual work by the worker P. For example, as the manual work by the worker P, there is a work of connecting the tube 541 extending from the chemical solution bag 54 to a connector 212 of the liquid formulation filling module 21. As the manual work by the worker P, there is a work of monitoring an internal environment of the liquid formulation filling module 21. Specifically, the worker P receives a Petri dish 213 containing a culture medium from a culture medium conveyance module 24. The worker P installs the received Petri dish 213 at a predetermined position 214 of the liquid formulation filling module 21.

Figure 4:
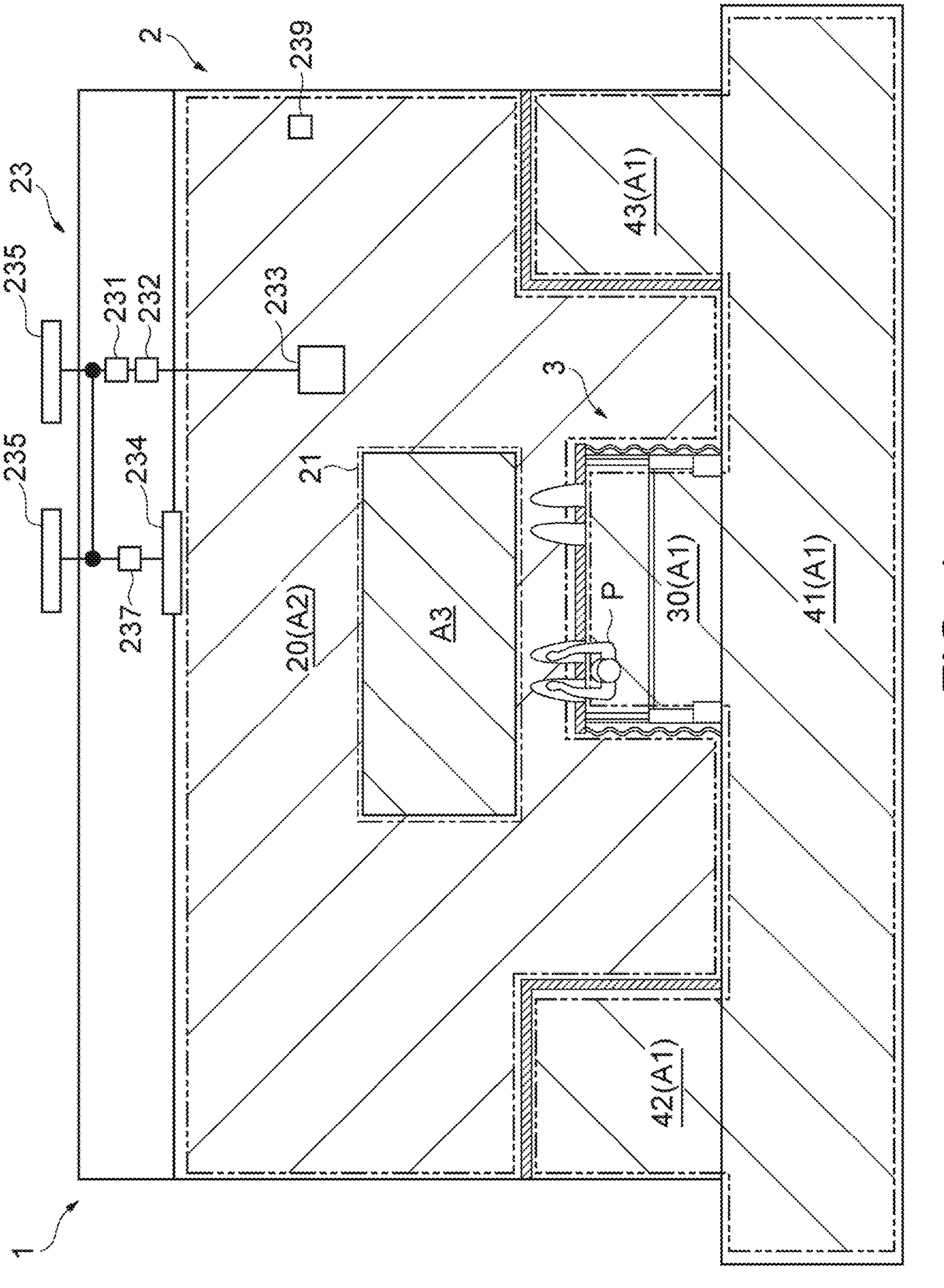
FIG. 4 is a plan view visualizing a degree of cleanliness of the clean room equipment illustrated in FIG. 1.

FIG. 4 is a diagram visually illustrating a difference in an indoor state in the clean room facility 1 illustrated in FIG. 2. The clean room facility 1 includes a first region A1, a second region A2, and a third region A3. These regions are divided in accordance with degrees of cleanliness. The degree of cleanliness of the first region A1 is the lowest. The degree of cleanliness of the third region A3 is the highest.

The first region A1 includes the work space 30, the corridor 41, the loading chamber 42, and the unloading chamber 43. In a case where the worker moves back and forth between these locations, preparation is not required. The second region A2 includes the clean space 20. The degree of cleanliness of the second region A2 is higher than the degree of cleanliness of the first region A1. For example, the degree of cleanliness of the second region A2 may be Grade C defined in the EU-Good Manufacturing Practice (EU-GMP) regarding manufacturing management and quality management of pharmaceutical production sites in Europe. Accordingly, in order to enter the second region A2 from the first region A1, it is necessary to perform preparation for maintaining the degree of cleanliness of the second region A2. The third region A3 is included in the second region A2. The degree of cleanliness of the third region A3 is higher than the degree of cleanliness of the second region A2. For example, the degree of cleanliness of the third region A3 may be Grade A defined in the EU-GMP. The third region A3 includes an interior space of the liquid formulation filling module 21.

The clean room facility 1 of the embodiment includes the work space equipment 3. The worker P can execute a predetermined work on the liquid formulation filling module 21 installed in the second region A2 from the work space 30 included in the first region A1. That is, the worker P does not need to enter the clean space 20 when the worker performs a work on the liquid formulation filling module 21 installed in the clean space 20.

Work Space Equipment

The work space equipment 3 will be described in detail. The work space equipment 3 forms, in the clean space 20, the work space 30 isolated from the clean space 20. The work space equipment 3 can adjust a size of the work space 30 occupying the clean space 20.

Specifically, the work space equipment 3 exits from the clean space 20 to reduce a work space 30A (first work space) occupying the clean space 20 (see (a) of FIG. 5 and (a) of FIG. 6). The form illustrated in (a) of FIG. 5 and (a) of FIG. 6 is referred to as a “storage form” (first form). The work space equipment 3 expands a work space 30B (second work space) occupying the clean space 20 by entering the clean space 20 (see (b) of FIG. 5 and (b) of FIG. 6). The form illustrated in (b) of FIG. 5 and (b) of FIG. 6 is referred to as an “expansion form” (second form).

According to a storage form T1, the work space 30 contracts to the vicinity of the clean room wall surface 222. In other words, the clean space 20 expands. For example, when the maintenance of the liquid formulation filling module 21 is performed, it is necessary to open a door of the liquid formulation filling module 21. A sufficient space is required to open the door. According to the storage form T1, it is possible to secure a space of the clean space 20 required for such a work.

According to an expansion form T2, the work space 30 extends to the vicinity of the liquid formulation filling module 21. When the worker P in the work space 30 extends his or her hand, the worker P can touch the liquid formulation filling module 21. Accordingly, the worker P can perform a predetermined work such as the connection of the tube 541 or the disposition of the Petri dish 213 on the liquid formulation filling module 21.

In addition, a region 20S (see (a) of FIG. 7) where the storage form T1 and the expansion form T2 overlap each other has two functions of the region (work space 30A) where the worker P performs the work from the outside of the room without entering the clean space 20 and the region where the worker P enters the clean space 20 to perform the work. This is because, in the storage form T1, components (for example, a definition sheet 34 to be described below) constituting the expansion form T2 do not interfere with the work in the clean space 20. That is, it can be said that the work space and a plot of a maintenance space can be shared. Accordingly, according to the work space equipment 3, a certain region 20S in the clean space 20 can be used for two applications different from each other. As a result, according to the work space equipment 3, an effect of space saving can be obtained.

As illustrated in (b) of FIG. 6, the work space equipment 3 includes a fixed floor 31, a movable floor 32, a movable wall 33, a definition sheet 34, and a work space controller 35 (first control unit).

The fixed floor 31 is a so-called earth floor provided in the work space 30. The fixed floor 31 is provided on the clean room floor surface 221 defining the clean space 20. A first fixed floor base end 31*a* of the fixed floor 31 is connected to the corridor 41. A second fixed floor distal end 31*b* of the fixed floor 31 is positioned on the clean room floor surface 221. The fixed floor 31 has a fixed floor entry surface 31*p* that the worker P can enter.

The movable floor 32 is movable on the clean room floor surface 221 defining the clean space 20. More specifically, the movable floor 32 can switch between the storage form T1 (see (a) of FIG. 5 and (a) of FIG. 6) and the expansion form T2 (see (b) of FIG. 5 and (b) of FIG. 6). The storage form T1 is a state where the movable floor 32 is disposed on the fixed floor entry surface 31*p*. The expansion form T2 is a state where the movable floor 32 protrudes so as to enter the clean space 20 from the fixed floor distal end 31*b*. The movable floor 32 is switched between the storage form T1 and the expansion form T2 by a movable floor drive device 32D. A specific configuration of the movable floor drive device 32D is not particularly limited, and any mechanism may be adopted. For example, the movable floor drive device 32D includes a drive source 32D1 and a drive frame 32D2. The movable floor drive device 32D receives a start control command C3*a* output from the work space controller 35 and switches between the storage form T1 and the expansion form T2. The start control command C3*a* includes an expansion control command C3*a*1 for switching from the storage form T1 to the expansion form T2, and a storage control command C3*a*2 for switching from the expansion form T2 to the storage form T1.

The movable floor 32, which is a plate-shaped member, has a movable floor entry surface 32*p* that the worker P enters. Accordingly, the movable floor entry surface 32*p* faces the work space 30. A movable floor back surface 32*r*, which is a back surface of the movable floor entry surface 32*p*, faces the clean space 20. In the expansion form T2, a gap is formed between the movable floor back surface 32*r* and the clean room floor surface 221. The movable floor back surface 32*r* is separated from the clean room floor surface 221.

The movable wall 33 rises from a movable floor distal end 32*b* of the movable floor 32. The movable wall 33 can enter the clean space 20 and can exit from the clean space 20 together with the movable floor 32. The movable wall 33 has a movable wall inner surface 33*a* and a movable wall outer surface 33*b*. The movable wall inner surface 33*a* faces the work space 30. The movable wall outer surface 33*b* faces the clean space 20. The movable floor distal end 32*b* may be coupled to the movable wall inner surface 33*a*. In this case, a roller 331 may be provided at a lower end of the movable wall 33. The movable wall 33 includes a work site 332. The work site 332 is a site in which the worker P performs a desired work on the liquid formulation filling module 21. For example, the work site 332 may have a first glove set 332*a*, a second glove set 332*b*, and a window 332*c*.

The first glove set 332*a* and the second glove set 332*b* protrude from the movable wall outer surface 33*b* of the movable wall 33 facing the clean space 20 toward the clean space 20. The first glove set 332*a* and the second glove set 332*b* allow the worker P to operate the liquid formulation filling module 21 while maintaining a state where the work space 30 is separated from the clean space 20. For example, the first glove set 332*a* is used for a work of installing the culture medium in the liquid formulation filling module 21. The second glove set 332*b* is used for the work of connecting the tube 541 of the chemical solution bag 54 to the connector 212 of the liquid formulation filling module 21.

A movable wall drive device 33D for moving the movable wall 33 may be provided in the movable wall 33. For example, the movable wall drive device 33D includes a drive source 33D1 and a drive frame 33D2. The drive frame 33D2 is disposed on a ceiling side of work space 30, and extends from the clean room wall surface 222 toward the movable wall 33. A distal end of the drive frame 33D2 is coupled to the movable wall 33. The drive frame 33D2 stretches and shrinks by a driving force received from the drive source 33D1. As a result, the movable wall 33 may move.

Any one or both of the movable wall drive device 33D and the movable floor drive device 32D may be provided.

Incidentally, when ae shape of the work space 30 is a rectangular parallelepiped, a first surface is a surface that the work space 30 enters from the corridor 41. A second surface is the movable wall 33 facing the first surface. A third surface is the fixed floor 31 and the movable floor 32 extending from the first surface to the second surface. In doing so, in order to form the work space 30 isolated from the clean space 20, it is necessary to cover the remaining three surfaces. That is, it is necessary to cover a ceiling surface, a first side surface, and a second side surface of the work space 30. The definition sheet 34 covers these surfaces.

The movable floor 32 and the movable wall 33 are plate-shaped members. That is, the movable floor 32 and the movable wall 33 themselves are not deformed with the movement. On the other hand, the definition sheet 34 is flexibly deformed with the movement of the movable floor 32 and the movable wall 33. The definition sheet 34 may be a resin sheet having flexibility.

A first edge portion 34*a* of the definition sheet 34 is coupled to the movable wall inner surface 33*a* of the movable wall 33. A second edge portion 34*b* of the definition sheet 34 is coupled to the clean room wall surface 222 defining the clean space 20. For example, when the movable floor 32 is in the storage form T1, a distance from the movable wall 33 to the clean room wall surface 222 becomes short. In this case, the definition sheet 34 is, for example, in a bellows form folded multiple times. On the other hand, when the movable floor 32 is in the expansion form T2, the distance from the movable wall 33 to the clean room wall surface 222 becomes long. In this case, the definition sheet 34 is, for example, in an unfolded state where the bellows form is unfolded. In the unfolded state, the definition sheet 34 may be in a flat state without creases.

The definition sheet 34 capable of switching between the bellows form and the unfolded form can stretch as the movable floor 32 and the movable wall 33 enter the clean space 20. Note that, this "stretching" means that the definition sheet 34 folded in the bellows shape is spread. The definition sheet 34 can also shrink as the movable floor 32 and the movable wall 33 exit from the clean space 20. This "shrinking" means that the definition sheet 34 shrinks by being folded in the bellows shape. When the definition sheet 34 stretches and when the definition sheet 34 shrinks, it is possible to maintain a state where the work space 30 is separated from the clean space 20.

A difference between a shape of the definition sheet 34 in the storage form T1 and a shape of the definition sheet 34 in the expansion form T2 may be defined by crest portions 34*t* and valley portions 34*d* in the definition sheet 34. As illustrated in (a) of FIG. 6 and (b) of FIG. 6, the definition sheet 34 has a wave shape in which the crest portions 34*t* and the valley portions 34*d* are alternately formed. In the storage form T1, a first distance from the crest portion 34*t* to the valley portion 34*d* of the definition sheet 34 can be defined as a height 34*h*1. In addition, in the expansion form T2, a second distance from the crest portion 34*t* to the valley portion 34*d* in the definition sheet 34 can be defined as a height 34*h*2. The height 34*h*2 is lower than the height 34*h*1. Accordingly, in the expansion form T2, the unevenness of the definition sheet 34 is small. As a result, a definition sheet outer surface 34*p* and a definition sheet inner surface 34*r* of the definition sheet 34 can be easily cleaned. Accordingly, the definition sheet outer surface 34*p* of the definition sheet 34 can be kept clean.

The definition sheet 34 includes a ceiling surface sheet portion 341 covering the ceiling surface of the work space 30, a first side surface sheet portion 342 (see FIG. 5) covering the first side surface of the work space 30, and a second side surface sheet portion 343 (see FIG. 5) covering the second side surface of the work space 30. The sheet portions may be coupled to each other, and may be one sheet when the coupled sheet portions are unfolded. In addition, each of the sheet portions may be one sheet.

Note that, the definition sheet 34 may have a floor surface sheet portion 344 provided between the movable floor back surface 32*r* of the movable floor 32 and the clean room floor surface 221. The floor surface sheet portion 344 is coupled to the fixed floor 31 and coupled to the movable wall 33. The floor surface sheet portion 344 covers the movable floor back surface 32*r* in the expansion form T2.

FIG. 8 is a diagram schematically illustrating a control system including the air conditioning controller 238 and the work space controller 35. The air conditioning controller 238 and the work space controller 35 cause the internal pressure of the clean space 20 to fall within a predetermined range, and expand and store the work space 30.

The air conditioning controller 238 is connected to a pressure sensor 239. The air conditioning controller 238 receives pressure data D2 from the pressure sensor 239. The pressure data D2 is information indicating the internal pressure of the clean space 20. The air conditioning controller 238 generates the pressure control command C2*a* for controlling the motor damper 237 based on the pressure data D2. The air conditioning controller 238 outputs the pressure control command C2*a* to the motor damper 237. The air conditioning controller 238 includes a pressure control command generation unit 238*a* as a functional component for generating the pressure control command C2*a*.

The air conditioning controller 238 is also connected to the work space controller 35. The air conditioning controller 238 generates a request command C2*b* for controlling an operation of the work space controller 35 based on the pressure data D2. The air conditioning controller 238 outputs the request command C2*b* to the motor damper 237. The air conditioning controller 238 includes a request command generation unit 238*b* as a functional component for generating the request command C2*b*.

The work space controller 35 is connected to the movable floor drive device 32D and the movable wall drive device 33D. The work space controller 35 outputs the start control command C3*a* to the movable floor drive device 32D and/or the movable wall drive device 33D. The start control command C3*a* includes the expansion control command C3*al* for switching from the storage form T1 to the expansion form T2, and the storage control command C3*a*2 for switching from the expansion form T2 to the storage form T1. The work space controller 35 includes a start control command generation unit 35*a* as a functional component for generating the start control command C3*a*.

The start control command generation unit 35*a* may output the start control command C3*a* in accordance with the operation of the worker P. For example, a button 351 for "expansion" and a button 352 for "storage" may be provided in the work space controller 35. When the worker P presses the button 351 for "expansion", the start control command generation unit 35*a* may output the expansion control command C3*a*1. When the worker P presses the button 352 for "storage", the start control command generation unit 35*a* may output the storage control command C3*a*2.

A moving amount of the movable floor 32 and/or the movable wall 33 can be illustrated as information regarding the entry of the expansion control command C3*a*1 into the clean space 20 (management space). A moving speed of the movable floor 32 and/or the movable wall 33 can also be illustrated as information regarding the entry. The expansion control command C3*a*1 may include only the moving amount. The expansion control command C3*a*1 may include only the moving speed. The expansion control command C3*a*1 may include both the moving amount and the moving speed.

For example, the expansion control command C3*a*1 may constantly move the movable floor 32 and the movable wall 33 by a maximum moving amount. The expansion control command C3*a*1 may move the movable floor 32 and the movable wall 33 as much as the worker P desires. For example, the expansion control command C3*a*1 may be output while the worker P presses the "expansion" button 351, and the output may be stopped when the worker P releases the "expansion" button 351. According to this configuration, the worker P can set the moving amounts of the movable floor 32 and the movable wall 33 to desired values by adjusting a time for which the "expansion" button 351 is pressed.

In addition to the start control command C3*a*, the work space controller 35 further outputs an operation control command C3*b* to the movable floor drive device 32D and/or the movable wall drive device 33D. The operation control command C3*b* includes a stop control command C3*b*1 for temporarily stopping the switching operation and a restart control command C3*b*2 for restarting the temporarily stopped switching operation. The work space controller 35 includes an operation control command generation unit 35*b* as a functional component for generating the operation control command C3*b*. The operation control command generation unit 35*b* outputs the stop control command C3*b*1 or the restart control command C3*b*2 in accordance with the request command C2*b* of the air conditioning controller 238.

Switching Operation

The switching operation by the work space controller 35 and the air conditioning controller 238 will be described in detail with reference to FIG. 9. It is assumed that the work space equipment 3 is in the storage form T1 (see (a) of FIG. 7). It is assumed that the work space equipment 3 switches from the storage form T1 to the expansion form T2 (see (b) of FIG. 7).

First, the work space controller 35 outputs the expansion control command C3*a*1 (step S40). As a result, the switching from the storage form T1 to the expansion form T2 is started. As the switching progresses, a volume of the work space 30 increases. In other words, a volume of the clean space 20 decreases. As a result, even though it is assumed that the amount of air sent into the clean space 20 and the amount of air taken in from the clean space 20 are the same, the internal pressure of the clean space 20 increases as the volume of the clean space 20 decreases.

The air conditioning controller 238 executes control for maintaining the internal pressure within a predetermined range. Specifically, the air conditioning controller 238 gives the pressure control command C2*a* to the motor damper 237 (step S41). As a result, since the amount of air exhausted from the outside air discharge port 235 to the outside increases, the internal pressure of the clean space 20 decreases. The control of the motor damper 237 by the air conditioning controller 238 is basically continued. That is, the control of the motor damper 237 by the air conditioning controller 238 may be constantly executed during a period in which operations in steps S42 to S49 to be described below are executed.

Here, the air conditioning controller 238 determines whether or not the pressure control by the motor damper 237 catches up with a pressure change in the clean space 20 (step S42). For example, the air conditioning controller 238 observes a temporal change in a value of the internal pressure obtained from the pressure sensor 239. In a case where the value of the internal pressure falls within a predetermined allowable range, the air conditioning controller 238 determines that the pressure control catches up with the pressure change (step S42: YES). In a case where the value of the internal pressure does not fall within the predetermined allowable range, the air conditioning controller 238 determines that the pressure control does not catch up the pressure change (step S42: NO). Examples of the case where the value of the internal pressure does not fall within the predetermined allowable range include a case where the value of the internal pressure gradually increases with the lapse of time, and as a result, the value of the internal pressure exceeds an upper limit value of the allowable range.

When the pressure control catches up with the pressure change, the switching from the storage form T1 to the expansion form T2 is continued (step S43). Subsequently, the work space controller 35 determines whether or not the switching from the storage form T1 to the expansion form T2 is completed (step S44). For example, the work space controller 35 may determine that the switching from the storage form T1 to the expansion form T2 is completed on a condition in which a moving distance of the movable wall 33 reaches a predetermined distance.

In a case where it is determined that the switching from the storage form T1 to the expansion form T2 is completed (step S44: YES), the work space controller 35 outputs the stop control command C3*b*1 for stopping the movement of the movable wall 33.

In a case where it is not determined that the switching from the storage form T1 to the expansion form T2 is completed (step S44: NO), the operations from step S42 are executed again by the work space controller 35 and the air conditioning controller 238. The operations from step S42 to step S44 are repeated until the determination result in step S44 becomes "YES".

In a case where the pressure control does not catch up with the pressure change, the switching from the storage form T1 to the expansion form T2 is temporarily stopped (step S46). Specifically, the air conditioning controller 238 outputs, to the work space controller 35, a stop request command C2*b*1 for giving a request about the temporary stop of the switching from the storage form T1 to the expansion form T2. The work space controller 35 having received the stop request command C2*b*1 outputs the stop control command C3*b*1 for temporarily stopping the switching from the storage form T1 to the expansion form T2. As a result, the movement of the movable wall 33 is stopped. That is, the decrease in the volume of the clean space 20 is temporarily stopped. Even during this stop period, the control of the motor damper 237 by the air conditioning controller 238 is executed. Therefore, the air conditioning controller 238 determines whether or not the value of the internal pressure falls within a predetermined allowable range (step S47). In a case where it is determined that the value of the internal pressure falls within the predetermined allowable range (step S47: YES), the switching from the storage form T1 to the expansion form T2 is restarted (step S48). Specifically, the air conditioning controller 238 outputs, to the work space controller 35, the restart control command C3*b*2 for giving a request about the restart of the switching from the storage form T1 to the expansion form T2. The work space controller 35 having received the restart control command C3*b*2 outputs the restart control command C3*b*2 for restarting the switching from the storage form T1 to the expansion form T2. Subsequently, the operations from step S42 are executed again.

In a case where it is determined that the value of the internal pressure does not fall within the predetermined allowable range (step S47: NO), the stop of the switching from the storage form T1 to the expansion form T2 is continued (step S49). Subsequently, after the predetermined period has elapsed, the air conditioning controller 238 again determines whether or not the value of the internal pressure falls within the predetermined allowable range (step S47). Steps S47 and S49 are repeatedly executed until the determination result in step S47 becomes "YES".

Work Method

Next, a work method in the clean room facility 1 will be described with reference to FIG. 10. As an initial state, it is assumed that the work space equipment 3 is in the storage form T1.

First, the work space 30 expands (step S1). The worker P presses the "expansion" button 351 of the work space controller 35 (step S11). With step S11 as a trigger, the above-described switching operation (step S4) is executed.

Subsequently, the work is performed (step S2). The worker P enters the work space 30 (step S21). Subsequently, for example, in a case where a work of setting the culture medium is performed, the worker P puts a hand into the first glove set 332*a* (step S22). For example, in a case where the work of connecting the tube 541 of the chemical solution bag 54 to the connector 212 is performed, the worker P puts a hand into the second glove set 332*b* (step S22). The worker P performs a predetermined work (step S23).

Subsequently, the work space 30 is stored (step S3). Step S3 may be performed as necessary. First, the worker P presses the "storage" button 352 of the work space controller 35 (step S31). By step S31, the above-described switching operation (step S4) is executed.

Actions and Effects

The work space equipment 3 forms the work space 30 for performing a work related to the liquid formulation filling module 21 disposed in the clean space 20 in which the internal pressure is managed.

The work space equipment 3 includes the movable wall 33 having the work site 332 facing the liquid formulation filling module 21 provided therein and capable of entering the clean space 20 and exiting from the clean space 20, and the definition sheet 34 that stretches along with the entry of the movable wall 33 into the clean space 20 and shrinks along with the exit of the movable wall 33 from the clean space 20 while maintaining a state where the work space 30 is separated from the clean space 20 by the first edge portion coupled to the movable wall 33 and the second edge portion coupled to the clean room wall surface 222 defining the clean space 20.

The work space equipment 3 switches between the storage form T1 in which the movable wall 33 exits from the clean space 20 to define the work space 30A and the expansion form T2 in which the movable wall 33 enters the clean space 20 to define the work space 30B wider than the work space 30A.

The work space equipment 3 forms the work space 30 separated from the clean space 20. The work space 30 is formed by the movable floor 32, the movable wall 33, and the definition sheet 34. As a result, the movable wall 33 including the work site 332 can be brought closer to the liquid formulation filling module 21 while maintaining the state where the work space 30 is isolated from the clean space 20. Accordingly, the liquid formulation filling module 21 disposed in the clean space 20 can be accessed from the work space 30 separated from the clean space 20 without entering the clean space 20.

The work space equipment 3 further includes the fixed floor 31 provided in the work space 30. The movable floor 32 and the movable wall 33 enter from a distal edge of the fixed floor 31 toward the clean space 20. This configuration also allows easy access the liquid formulation filling module 21 disposed in the clean space 20.

The definition sheet 34 has the definition sheet outer surface 34*p* exposed to the clean space 20 and the definition sheet inner surface 34*r* exposed to the work space 30. In the first form, the definition sheet 34 is in the bellows form folded multiple times. In the second form, the definition sheet 34 is in the unfolded state where the bellows form is unfolded. According to this configuration, the ceiling and the side wall that can follow the movement of the movable floor 32 and the movable wall 33 can be formed.

The first glove set 332*a* and the second glove set 332*b* protruding from the clean space 20 from the movable wall outer surface 33*b* of the movable wall 33 facing the clean space 20 are provided in the work site 332. The first glove set 332*a* and the second glove set 332*b* can be brought into contact with the liquid formulation filling module 21 while maintaining a state where the work space 30 is separated from the clean space 20. According to this configuration, the worker P can perform the manual work on the liquid formulation filling module 21.

The work space equipment 3 includes the work space controller 35 that outputs the start control command C3*a* for starting the movement of the movable wall 33, and the air conditioning controller 238 that outputs the pressure control command C2*a* for controlling the internal pressure of the clean space 20. The air conditioning controller 238 acquires the pressure data D2 indicating the internal pressure of the clean space 20. The air conditioning controller 238 outputs the request command C2*b* for requesting stop of the movement of the movable wall 22 or restart of the movement of the movable wall 22 to the work space controller 35 in accordance with the pressure data D2.

According to this work method, the work related to the liquid formulation filling module 21 disposed in the clean space 20 in which the internal pressure is managed is performed.

The work method includes step S1 of expanding the work space 30 by operating the work space equipment 3 which is provided in the clean room equipment 2 forming the clean space 20 and forms the work space 30 for performing the work related to the liquid formulation filling module 21, and step S2 of performing a predetermined work on the liquid formulation filling module 21 through the work site 332 in the expanded work space 30. In step S1 of expanding the work space 30, the work space 30 is expanded by switching from the storage form T1 in which the movable floor 32 and the movable wall 33 exit from the clean space 20 to define the work space 30A to the expansion form T2 in which the movable floor 32 and the movable wall 33 enter the clean space 20 to define the work space 30B wider than the work space 30A.

According to this work method, the work space 30 can be brought close to the liquid formulation filling module 21 in step S1 of expanding the work space 30. The worker P can perform the predetermined operation on the liquid formulation filling module 21 from the work space 30 (step S2). Accordingly, according to this work method, the worker P can easily access the liquid formulation filling module 21 disposed in the clean space 20.

The clean room facility 1 includes the clean room equipment 2 for managing internal pressure and forming the clean space 20 for accommodating the liquid formulation filling module 21, and the work space equipment 3 for performing the work related to the liquid formulation filling module 21 from the work space 30 separated from the clean space 20.

The work space equipment 3 includes the movable floor 32 in which the clean room floor surface 221 that defines the clean space 20 is movable and has the entry surface facing the work space 30, the movable wall 33 that rises from a distal end side of the movable floor 32, has the work site 332 facing the liquid formulation filling module 21 provided thereon, and is capable of entering the clean space 20 and exiting from the clean space 20 together with the movable floor 32, and the definition sheet 34 that stretches with the entry of the movable floor 32 and the movable wall 33 into the clean space 20 and shrinks with the exit of the movable floor 32 and the movable wall 33 from the clean space 20 while maintaining a state where the work space 30 is separated from the clean space 20 by the first edge portion coupled to the movable wall 33 and the second edge portion coupled to the clean room wall surface 222 that defines the clean space 20.

The work space equipment 3 switches between the storage form T1 in which the movable floor 32 and the movable wall 33 exit from the clean space 20 to define the work space 30A and the expansion form T2 in which the movable floor 32 and the movable wall 33 enter the clean space 20 to define the work space 30B wider than the work space 30A.

The clean room facility 1 includes the work space equipment 3. Accordingly, similar to the work space equipment 3, the liquid formulation filling module 21 disposed in the clean space 20 can be accessed from the work space 30 separated from the clean space 20.

The work space forming equipment, the work method, and the management space facility according to the present invention are not limited to the above-described embodiment, and various modifications can be made without departing from the gist of the present invention.

In the embodiment, the air conditioning controller 238 and the work space controller 35 have been described as separate devices. For example, these controllers may be one device. For example, the air conditioning controller 238 may additionally have the function of the work space controller 35.

The control of the air conditioning controller 238 when the volume of the clean space 20 is constant and the control of the air conditioning controller 238 when the volume of the clean space 20 is changing may have the same or different specific control aspects. The control aspects mentioned herein may be defined as, for example, settings of gains (P gain, D gain, and I gain) in PID control. A case where the control aspects are the same means that the gain setting of the air conditioning controller 238 when the volume of the clean space 20 is constant and the gain setting of the air conditioning controller 238 when the volume of the clean space 20 is changing are the same. A case where the control aspects are different means that the gain setting of the air conditioning controller 238 when the volume of the clean space 20 is constant is different from the gain setting of the air conditioning controller 238 when the volume of the clean space 20 is changing.

FIG. 11 is a block diagram illustrating configurations of an air conditioning controller 238A and a work space controller 35A included in a clean room facility 1A according to a modification. For example, the air conditioning controller 238A may change a control aspect in accordance with an advance notice command C3*c* received from an advance notice command generation unit 35*c* of the work space controller 35A. The air conditioning controller 238A includes a control PID value change unit 238*c* that changes the control aspect. Specifically, the control PID value change unit 238*c* may switch a control PID value set as a first setting to a control PID value set as a second setting in accordance with the advance notice command C3*c* received from the work space controller 35A. The first setting is a setting when the volume of the clean space 20 is constant. The second setting is a setting when the volume of the clean space 20 is changing. The control PID value of the second setting may be set such that a response speed is faster than the control PID value of the first setting.

In a case where such an operation is adopted, first, the work space controller 35A receives an instruction of expansion or storage from the worker P. Subsequently, the advance notice command generation unit 35*c* of the work space controller 35A notifies the air conditioning controller 238 of the instruction for expansion or storage as the advance notice command C3*c*. At this time, the work space controller 35A does not output the control command to the movable floor drive device 32D and the movable wall drive device 33D. In other words, the work space controller 35A notifies the air conditioning controller 238 of the instruction of expansion or storage as the advance notice command C3*c* before the start control command C3*a* is output to the movable floor drive device 32D and the movable floor drive device 32D. The air conditioning controller 238 having received the advance notice command C3*c* switches the control PID value from the first setting to the second setting. Subsequently, the air conditioning controller 238 may notify the work space controller 35A that the switching of the control PID value is completed. Subsequently, the work space controller 35A having received the completion of the switching may output the start control command C3*a* to the movable floor drive device 32D and the movable wall drive device 33D. The work space controller 35A may output the start control command C3*a* in a condition in which a predetermined time has elapsed after the transmission of the advance notice command C3*c*.

In short, the work space equipment 3A includes the work space controller 35A that outputs the start control command C3*a* for starting the movement of the movable wall 33, and the air conditioning controller 238A that outputs the pressure control command C2*a* for controlling the internal pressure of the clean space 20. Before the start control command C3*a* is output, the work space controller 35A outputs, to the air conditioning controller 238A, the advance notice command C3*c* that gives an advance notice of outputting the start control command C3*a*. The air conditioning controller 238A changes the content of the pressure control command C2*a* by changing the control PID value in response to the advance notice command C3*c*. This configuration also allows the internal pressure of the clean space 20 to be maintained at a predetermined value.

In the above description, the clean space 20 of the clean room has been illustrated as the management space. The clean space 20 is maintained at a so-called positive pressure. The work space forming equipment, the work method, and the management space facility according to the present invention may be applied to a management space that is maintained at a negative pressure.

The invention claimed is:

1. A work space forming equipment that forms a work space for performing a work related to a work target disposed in a management space where an internal pressure is managed, the equipment comprising:

a movable wall in which a work site facing the work target is provided, the movable wall being capable of entering the management space and exiting from the management space; and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface that defines the management space, wherein switching is performed between a first form in which the movable wall exits from the management space to define a first work space, and a second form in which the movable wall enters the management space to define a second work space wider than the first work space.

2. The work space forming equipment according to claim 1, further comprising:

a movable floor movable on a management space floor surface that defines the management space along with the movement of the movable wall and having an entry surface facing the work space.

3. The work space forming equipment according to claim 2, further comprising:

a fixed floor provided in the work space, wherein the movable wall enters the management space from a distal end portion of the fixed floor.

4. The work space forming equipment according to claim 3, wherein the definition sheet has a definition sheet outer surface exposed to the management space and a definition sheet inner surface exposed to the work space, and has a wave shape in which crest portions and valley portions are alternately formed, in the definition sheet, a distance between the crest portion and the valley portion in the first form is a first distance, and a distance between the crest portion and the valley portion in the second form is a second distance, and the second distance is smaller than the first distance.

5. The work space forming equipment according to claim 3, wherein a globe that protrudes from a movable wall outer surface of the movable wall facing the management space to the management space and is capable of being brought into contact with the work target while maintaining a state where the work space is separated from the management space is provided in the work site.

6. The work space forming equipment according to claim 3, further comprising:

a first control unit that outputs a start control command for starting the movement of the movable wall; and a second control unit that outputs a pressure control command for controlling the internal pressure of the management space, wherein the first control unit outputs an advance notice command for giving an advance notice of outputting the start control command to the second control unit before the start control command is output, and the second control unit changes a content of the pressure control command in accordance with the advance notice command.

7. The work space forming equipment according to claim 3, further comprising:

a first control unit that outputs a start control command for starting the movement of the movable wall; and a second control unit that outputs a pressure control command for controlling the internal pressure of the management space, wherein the second control unit acquires information indicating the internal pressure of the management space, and outputs a request command for giving a request about stop of the movement of the movable wall or restart of the movement of the movable wall to the first control unit in accordance with the information indicating the internal pressure of the management space.

8. The work space forming equipment according to claim 2, wherein the definition sheet has a definition sheet outer surface exposed to the management space and a definition sheet inner surface exposed to the work space, and has a wave shape in which crest portions and valley portions are alternately formed, in the definition sheet, a distance between the crest portion and the valley portion in the first form is a first distance, and a distance between the crest portion and the valley portion in the second form is a second distance, and the second distance is smaller than the first distance.

9. The work space forming equipment according to claim 2, wherein a globe that protrudes from a movable wall outer surface of the movable wall facing the management space to the management space and is capable of being brought into contact with the work target while maintaining a state where the work space is separated from the management space is provided in the work site.

10. The work space forming equipment according to claim 2, further comprising:

a first control unit that outputs a start control command for starting the movement of the movable wall; and a second control unit that outputs a pressure control command for controlling the internal pressure of the management space, wherein the first control unit outputs an advance notice command for giving an advance notice of outputting the start control command to the second control unit before the start control command is output, and the second control unit changes a content of the pressure control command in accordance with the advance notice command.

11. The work space forming equipment according to claim 2, further comprising:

a first control unit that outputs a start control command for starting the movement of the movable wall; and a second control unit that outputs a pressure control command for controlling the internal pressure of the management space, wherein the second control unit acquires information indicating the internal pressure of the management space, and outputs a request command for giving a request about stop of the movement of the movable wall or restart of the movement of the movable wall to the first control unit in accordance with the information indicating the internal pressure of the management space.

12. The work space forming equipment according to claim 1, wherein the definition sheet has a definition sheet outer surface exposed to the management space and a definition sheet inner surface exposed to the work space, and has a wave shape in which crest portions and valley portions are alternately formed, in the definition sheet, a distance between the crest portion and the valley portion in the first form is a first distance, and a distance between the crest portion and the valley portion in the second form is a second distance, and the second distance is smaller than the first distance.

13. The work space forming equipment according to claim 12, wherein a globe that protrudes from a movable wall outer surface of the movable wall facing the management space to the management space and is capable of being brought into contact with the work target while maintaining a state where the work space is separated from the management space is provided in the work site.

14. The work space forming equipment according to claim 12, further comprising:

a first control unit that outputs a start control command for starting the movement of the movable wall; and a second control unit that outputs a pressure control command for controlling the internal pressure of the management space, wherein the first control unit outputs an advance notice command for giving an advance notice of outputting the start control command to the second control unit before the start control command is output, and the second control unit changes a content of the pressure control command in accordance with the advance notice command.

15. The work space forming equipment according to claim 12, further comprising:

a first control unit that outputs a start control command for starting the movement of the movable wall; and a second control unit that outputs a pressure control command for controlling the internal pressure of the management space, wherein the second control unit acquires information indicating the internal pressure of the management space, and outputs a request command for giving a request about stop of the movement of the movable wall or restart of the movement of the movable wall to the first control unit in accordance with the information indicating the internal pressure of the management space.

16. The work space forming equipment according to claim 1, wherein a globe that protrudes from a movable wall outer surface of the movable wall facing the management space to the management space and is capable of being brought into contact with the work target while maintaining a state where the work space is separated from the management space is provided in the work site.

17. The work space forming equipment according to claim 1, further comprising:

a first control unit that outputs a start control command for starting the movement of the movable wall; and a second control unit that outputs a pressure control command for controlling the internal pressure of the management space, wherein the first control unit outputs an advance notice command for giving an advance notice of outputting the start control command to the second control unit before the start control command is output, and the second control unit changes a content of the pressure control command in accordance with the advance notice command.

18. The work space forming equipment according to claim 1, further comprising:

a first control unit that outputs a start control command for starting the movement of the movable wall; and a second control unit that outputs a pressure control command for controlling the internal pressure of the management space, wherein the second control unit acquires information indicating the internal pressure of the management space, and outputs a request command for giving a request about stop of the movement of the movable wall or restart of the movement of the movable wall to the first control unit in accordance with the information indicating the internal pressure of the management space.

19. A work method for performing a work related to a work target disposed in a management space where an internal pressure is managed, the method comprising:

a step of expanding a work space by operating a work space forming equipment that is provided in a management space forming equipment that forms the management space and forms the work space for performing the work related to the work target; and a step of performing a predetermined work on the work target through a work site in the expanded work space, wherein the work space forming equipment includes a movable wall in which the work site facing the work target is provided, the movable wall being capable of entering the management space and exiting from the management space, and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface defining the management space, and in the step of expanding the work space, the work space is expanded by switching from a first form in which the movable wall exits from the management space to define a first work space to a second form in which the movable wall enters the management space to define a second work space wider than the first work space.

20. A management space facility comprising:

a management space forming equipment that forms a management space in which an internal pressure is managed and is for accommodating a work target; and a work space forming equipment for performing a work related to the work target from a work space separated from the management space, wherein the work space forming equipment includes a movable wall in which a work site facing the work target is provided, the movable wall being capable of entering the management space and exiting from the management space, and a definition sheet that stretches along with the entry of the movable wall into the management space and shrinks along with the exit of the movable wall from the management space while maintaining a state where the work space is separated from the management space by a first edge portion coupled to the movable wall and a second edge portion coupled to a management space wall surface that defines the management space, and switches between a first form in which the movable wall exits from the management space to define a first work space and a second form in which the movable wall enters the management space to define a second work space wider than the first work space.

* * * * *